(12) United States Patent
Molstad

(10) Patent No.: US 6,873,487 B2
(45) Date of Patent: Mar. 29, 2005

(54) HYBRID SERVOPOSITIONING SYSTEMS

(75) Inventor: Richard W. Molstad, St. Paul, MN (US)

(73) Assignee: Imation Corp., Oakdale, MN (US)

(*) Notice: Subject to any disclaimer, the term of this patent is extended or adjusted under 35 U.S.C. 154(b) by 482 days.

(21) Appl. No.: 09/995,175

(22) Filed: Nov. 26, 2001

(65) Prior Publication Data

US 2003/0099057 A1 May 29, 2003

(51) Int. Cl.[7] .......................... G11B 21/02; G11B 5/09
(52) U.S. Cl. .......................... 360/75; 360/48; 360/125
(58) Field of Search .......................... 360/75, 48, 125, 360/77.12

(56) References Cited

U.S. PATENT DOCUMENTS

| | | | | |
|---|---|---|---|---|
| 4,321,634 A | * | 3/1982 | Lehureau | 360/70 |
| 4,472,750 A | * | 9/1984 | Klumpp et al. | 360/78.01 |
| 4,685,013 A | * | 8/1987 | Joannou et al. | 360/125 |
| 5,055,951 A | * | 10/1991 | Behr | 360/77.12 |
| 5,121,270 A | * | 6/1992 | Alcudia et al. | 360/77.01 |
| 5,418,670 A | * | 5/1995 | McClure et al. | 360/131 |
| 5,426,543 A | | 6/1995 | Dy et al. | |
| 5,483,394 A | * | 1/1996 | Harman | 360/77.12 |
| 5,689,384 A | | 11/1997 | Albrecht et al. | |
| 5,898,533 A | | 4/1999 | Mantey et al. | |
| 5,930,065 A | | 7/1999 | Albrecht et al. | |
| 6,021,013 A | | 2/2000 | Albrecht et al. | |
| 6,111,719 A | * | 8/2000 | Fasen | 360/73.04 |
| 6,134,070 A | * | 10/2000 | Tran et al. | 360/75 |
| 6,580,581 B1 | * | 6/2003 | Bui et al. | 360/78.02 |
| 6,590,729 B1 | * | 7/2003 | Akagi et al. | 360/48 |
| 6,700,729 B1 | * | 3/2004 | Beck et al. | 360/76 |
| 6,710,967 B2 | * | 3/2004 | Hennecken et al. | 360/77.12 |

* cited by examiner

Primary Examiner—Sinh Tran
Assistant Examiner—K. Wong
(74) Attorney, Agent, or Firm—Eric D. Levinson

(57) ABSTRACT

Servopositioning systems, methods, formats, and data recording media used in association with the same, employing both time-based and amplitude-based transverse tracking servo bands in the same or different locations on the medium.

36 Claims, 6 Drawing Sheets

HYBRID SERVOPOSITIONING SYSTEMS

FIELD OF THE INVENTION

This invention concerns systems and methods for servopositioning in the context of linear data recording media such as magnetic tape.

BACKGROUND OF THE INVENTION

Modern data storage systems use servopositioning (or, "servo") systems to guide their recording and playback components with respect to a recording medium, and thus enable high track density, which increases data storage capacity. Errors in the ability to follow the servopositioning signals on the medium can cause unacceptable reductions in storage capacity, recording/playback rates, and other parameters that are important to consumers (and thus to system manufacturers).

Traditionally, there have been two distinct styles of servo patterns or formats for linear magnetic tape recording systems. One type employs so-called time-based servo techniques, an example of which is disclosed in U.S. Pat. No. 5,689,384. Commercial magnetic tape drives such as the IBM model 3570 and drives known under the names "Ultrium" and "Accelis" as described by the Linear Tape Open consortium, use time-based servopositioning systems. Another type employs so-called amplitude-based servo techniques, examples of which are disclosed in U.S. Pat. Nos. 5,426,543 and 5,898,533.

Each style of servo technique has advantages and disadvantages. The advantages of time-based servo systems include very wide dynamic range; inherent track identification; low DC centerline error; and the ability to qualify position error signal (PES) validity by the amplitude of the servo signal. Disadvantages include extreme sensitivity to tape speed during writing; sensitivity to high frequency speed error during reading; and poor scalability to very small track pitches. The advantages of amplitude-based servo systems roughly mirror the disadvantages of time-based servo systems, i.e., they include insensitivity to tape speed during writing; insensitivity to tape speed error during reading; and good scalability to very small track pitches. Similarly, the disadvantages of amplitude-based servo systems roughly mirror the advantages of time-based servo systems, i.e., they include limited dynamic range, no inherent track identification, considerable DC centerline error, and no secondary PES validity check.

SUMMARY OF THE INVENTION

In general terms, the invention may be embodied in servopositioning systems, methods, and formats, or in data recording media used in association with the same, and therefore this disclosure should be understood in that regard even if only an example of a particular embodiment is described in detail. Similarly, this disclosure should be understood to apply to either analog or digital signals, in accordance with principles known in the art. Thus, the terms "signal" "data" and the like may be used interchangeably, and should be understood to apply to either analog or digital representations of information.

The invention employs both time-based and amplitude-based transverse tracking servo bands in the same or different locations on the medium. One embodiment of the invention is a servopositioning system for a data recording system. Written upon a linear data recording medium, preferably magnetic recording tape, are at least one amplitude-based servo signal, and at least one time-based servo signal. The two types of servo signals may or may not be written onto the same location of the recording medium; in other words, there may be no overlap, partial overlap, or complete overlap of the physical locations on the medium upon which the two types of servo signals are written. The system also includes appropriate circuitry that is separately responsive to the amplitude-based servo signals, and the time-based servo signals, for producing respective position error signals from each servo signal.

Another embodiment of the invention is a method of servopositioning, in which at least a portion of a linear data recording medium is written with at least one amplitude-based servo signal, and at least one time-based servo signal. Again, the two types of servo signals may or may not be written onto the same location of the recording medium. The method produces respective position error signals from each servo signal.

Another embodiment of the invention is a magnetic data read-while-write head, comprising two pairs of oppositely arranged time-based servo reading gaps; amplitude-based servo reading gaps that are larger than the time-based servo reading gaps; and, between the pairs of oppositely arranged servo reading gaps, matched thin film magnetoresistive data read/write gaps.

BRIEF DESCRIPTION OF THE DRAWINGS

The accompanying drawings show a particular embodiment of the invention as an example, and are not intended to limit the scope of the invention.

DETAILED DESCRIPTION

In general terms, the invention can embodied in an entire system of data recording and playback, including the combination of a drive and a linear recording medium; or as only the recording medium portion of such a system; or as methods for recording or playing back data in combination with the data recording medium. Thus, while the following description may occasionally focus on only one aspect of an entire system (e.g., the recording medium alone) to disclose the preferred embodiment of the invention, this is by way of example only and not a limitation on the scope of the invention. It should be understood that the full scope of the invention includes other aspects of the system depending on the circumstances, such as combinations of the medium and drive, and methods of using such combinations or relevant portions of them.

Figure 1:
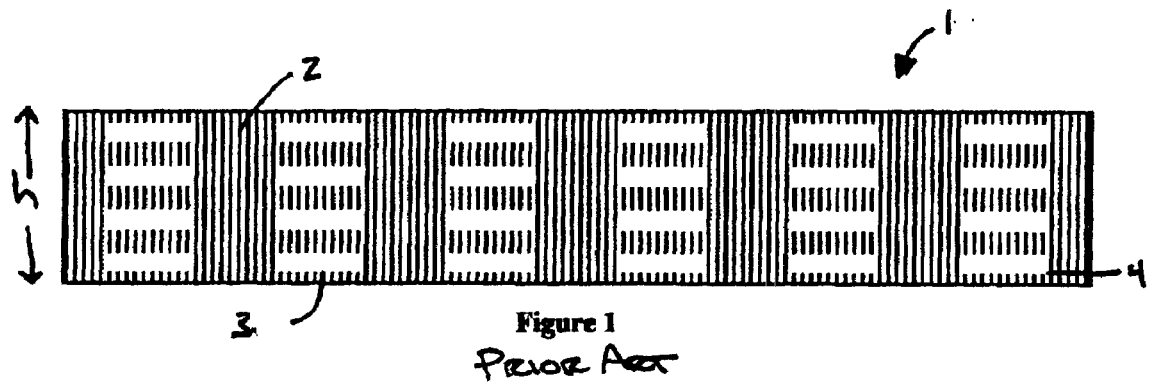
FIG. 1 is a schematic view of a prior art amplitude-based servo pattern.

FIG. 1 shows a representative prior art amplitude-based servo band 1 having band height h. As understood in the art, a sine wave recorded portion of pattern 2 surrounds erased "windows" 3 as represented by white rectangles. This particular pattern shows four windows in band 1, and therefore eight track pitches located at transverse edges of a row of windows 3, such as representative pitch 4, because there are two transverse edges to each of the four series of windows 3.

Figure 2:
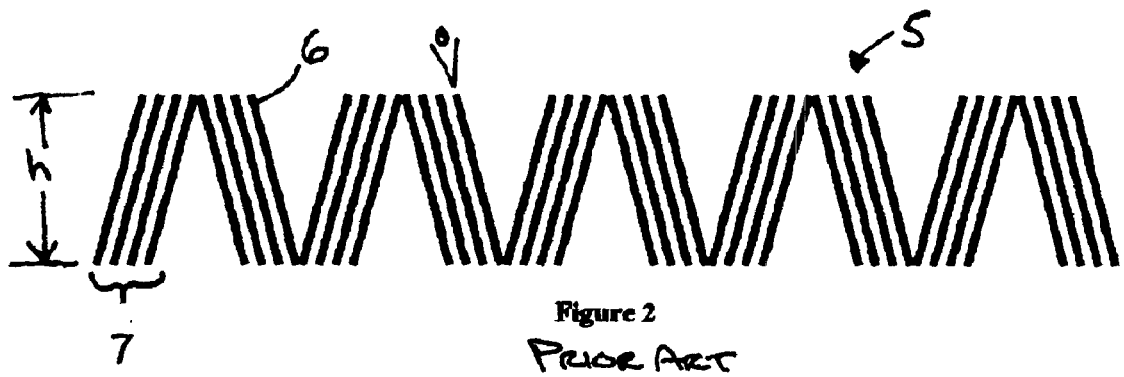
FIG. 2 is a schematic view of a prior art time-based servo pattern.

FIG. 2 shows a representative prior art time-based servo band 5 of the same band height h. By way of example only, the servo patterns has four pulses 6 per sample 7, and a 20 degree slant angle θ relative to the (vertical) transverse direction across with width of the tape. These particular values of pulses per sample and slant angle are examples only.

There are two approaches to implementing the invention. In each approach, amplitude-based servo patterns such as that shown in FIG. 1, are used in combination with time-based servo patterns such as that shown in FIG. 2.

Figure 3:
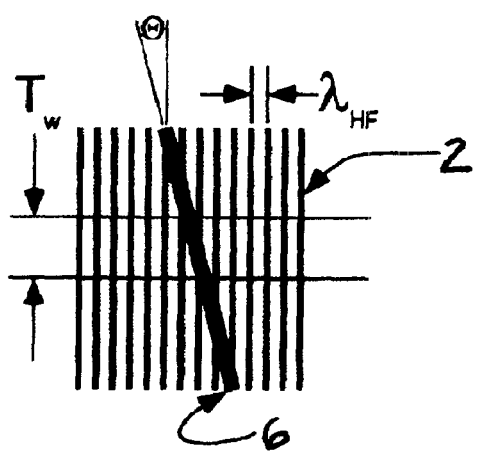
FIG. 3 is a schematic view of geometric aspects of one embodiment of the invention.

In the first of the two approaches, as indicated in FIG. 3, the time-based servo pattern is combined with the amplitude-based servo pattern. The preferred method of accomplishing this is to write the two patterns onto a common physical location of the medium. It is preferred, but not required, to have complete overlap of the areas on which the signals are written. However, partial overlap is within the scope of the invention, i.e., the amplitude-based servopositioning signal and the time-based servopositioning signal are written to the medium on at least a portion of a common location of the medium.

Figure 4:
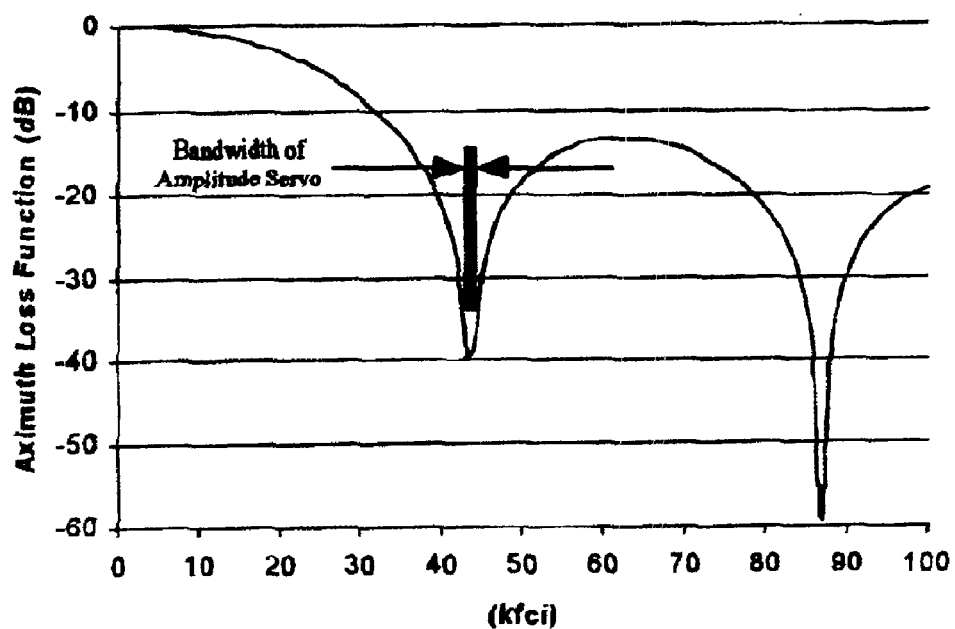
FIG. 4 is a schematic graph of the azimuth loss function of the embodiment of FIG. 3.

Referring additionally to FIG. 4, the approach of FIG. 3 relies on the fact that for a given read track width $T_w$ and a given slant angle θ, there is a natural spatial frequency null at a wavelength $\lambda_{HF}$ proportional to the read trackwidth and the tangent of the slant angle θ, or $\lambda_{HF}=T_w*\tan(\theta)$. Thus, placing the amplitude servo in the azimuth null of the time-based servo enables both types of servo system to be available to the servo controller after suitable filtering. Control of the rise time of the erasure bursts controls the bandwidth of the amplitude-based servo pattern. It is especially preferred to ramp the erasure current bursts to minimize pattern crosstalk.

Figure 5:
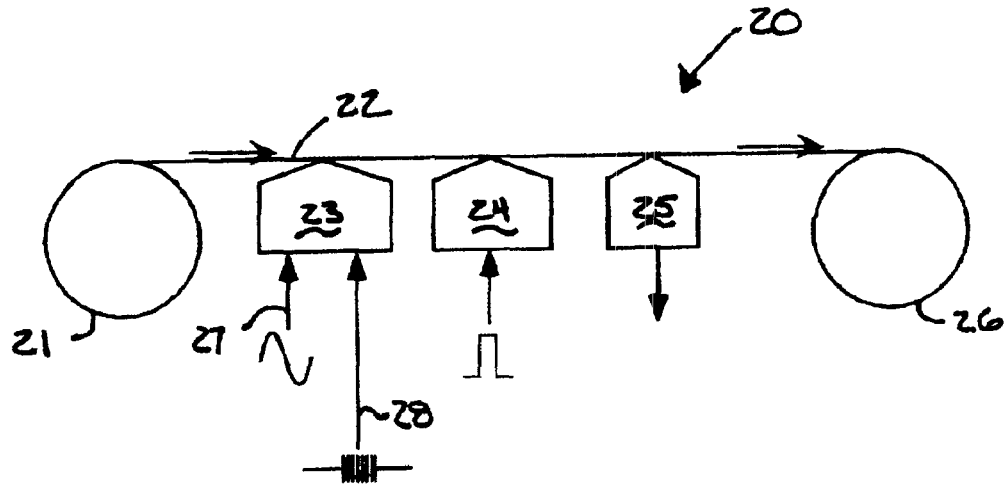
FIG. 5 is a schematic diagram of an embodiment of the invention.

FIG. 5 is a schematic view of one recording system embodiment suitable for this approach, using (for purposes of illustration only) magnetic recording tape as the preferred type of linear recording medium.

Recording system 20 comprises supply reel 21, tape 22, amplitude-based servo writer head 23, time-based servo write head 24, verify play head 25, and take up reel 26. The bias and carrier signal 27 is one input to amplitude servo writer head 23, along with the erase burst signal 28 that produces windows 3 described earlier with reference to FIG. 1. A current pulse signal 29 is the input to time-based servo write head 24. Verify write head 25 produces verify signal 30.

The amplitude-based servo is first written at whatver overall amplitude is suitable given the other constraints on the system. Next, the time-based servo signal is written. The time-based signal does not affect the other servo system because the time-based signal is written off-azimuth and has little energy in the bandwidth of the amplitude-based servo.

Figure 6:
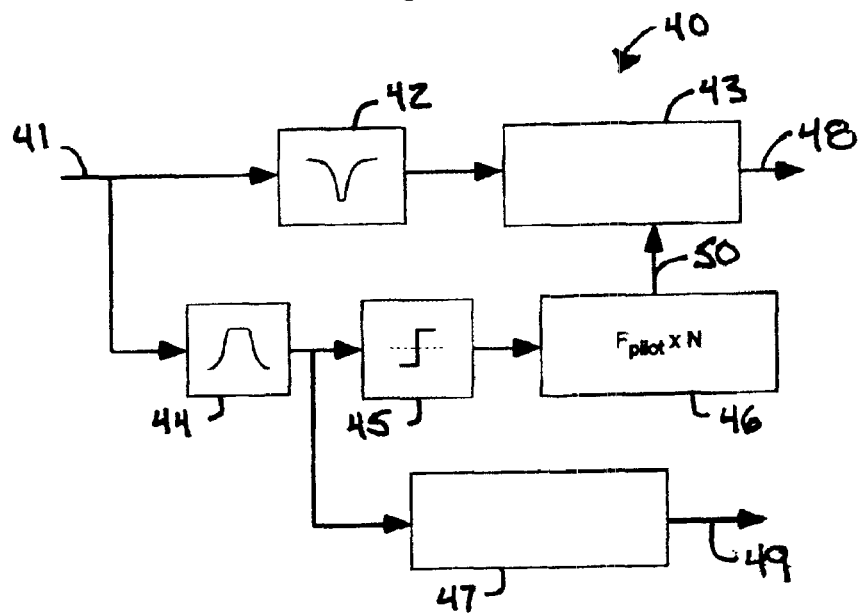
FIG. 6 is a schematic diagram of another embodiment of the invention.

FIG. 6 is a schematic diagram of a preferred embodiment of servo read circuitry 40. Servo read circuitry 40 receives an input composite signal 41 produced by the conventional servo read head preamp (not shown). This signal is divided by the combination of band reject filter 42 and band pass filter 44. The portion of the signal that passes through band reject filter 42 is the input to a time-based servo demodulator circuit 43. This produces a position error signal (PES) 48 that has wide dynamic range, but is relatively noisy, and operates in a "track seeking" mode to be described later. It is preferred, but not required, to use the portion of the signal that passes through band pass filter 44, after subsequently passing though hard limiter 45, as input to a phase locked loop 46 that produces a measurement timebase signal 50 for the time-based servo demodulator circuit 43. However, this is not required and therefore it is possible to provide the timebase signal 50 independently. The signal passing thorugh the band pass filter 44 also is the input to an amplitude-based servo demodulator circuit 47. This produces another position error signal (PES) 49 that has low dynamic range, but has relatively high resolution and operates in a "track following" mode to be described later.

For the servo pattern signals 48, 49 to be separable from each other, a certain amount of linearity in the entire playback system is necessary. Control of the absolute amplitude of the two formats will affect linearity and the degree of crosstalk between the two formats. Thus, a preferred embodiment relies on the fact that each interfering signal is known. Therefore, electronic crosstalk cancellation may be employed to improve the PES quality in both formats.

In the other of the two approaches to implementing the invention, amplitude-based servo patterns such as that shown in FIG. 1 are used in combination with time-based servo patterns such as that shown in FIG. 2, but they are not superpositioned on each other in the same physical location on the medium.

Figure 7:
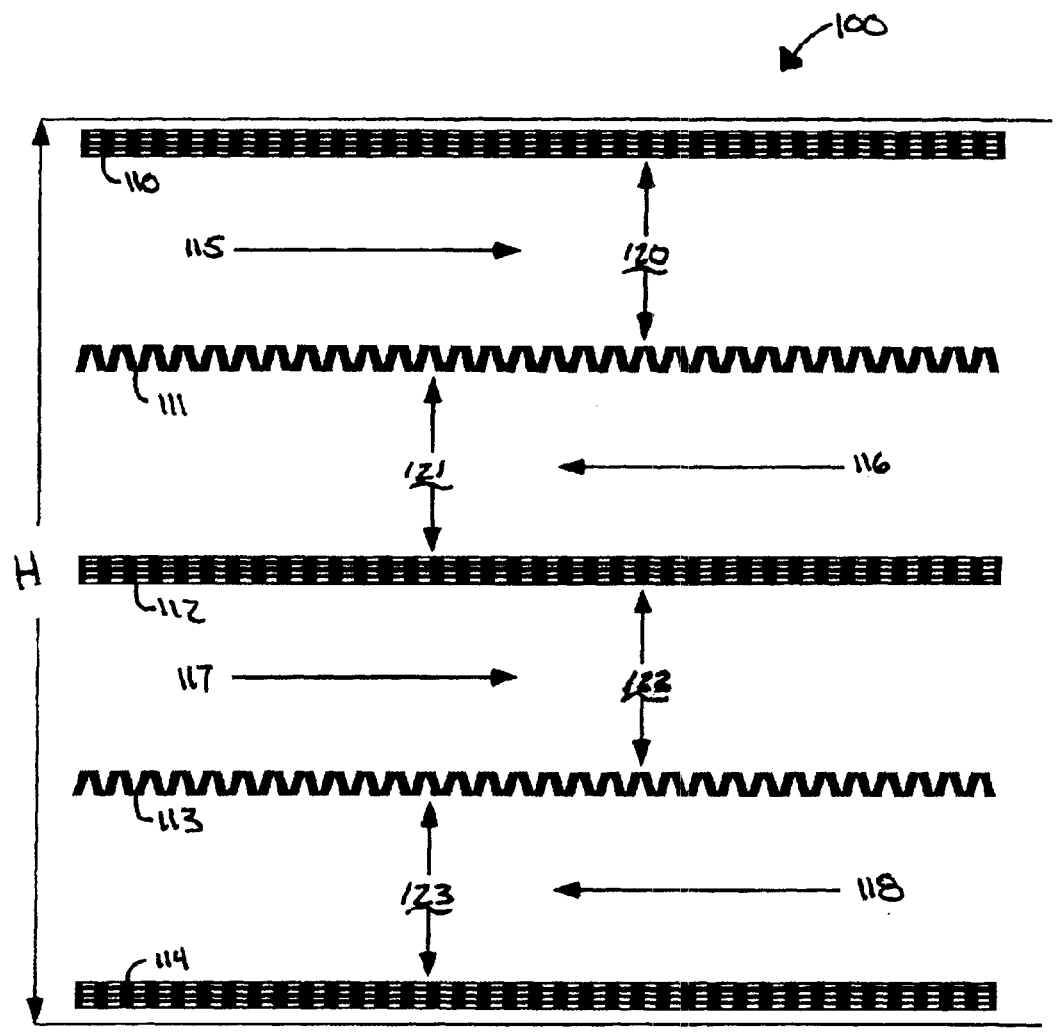
FIG. 7 is a schematic diagram of another embodiment of the invention.

FIG. 7 shows one preferred embodiment of this approach. The particular format of FIG. 7 shows a tape 100 having a transverse tape width H. Five servo bands 110–114 are combined across width H alternate with four data bands 120–123. The alternation of servo and data bands is preferred for conventional reasons but not a limitation on the scope of the invention. As shown, servo bands 110, 112, and 114 are amplitude-based, and servo bands 111 and 113 are time-based, but this is only an example; the five servo bands shown could be three time-based servo bands and two amplitude based servo bands.

Each amplitude-based servo band 110, 112, 114 has eight track pitches as described above for FIG. 1, and the servo bands are located a preferred constant distance of eight band pitches apart. Thus, each data band 120–123 could therefore accommodate sixty-four tracks, if an eight data channel head is used, as preferred. As indicated by arrows 115–118, the four data bands 120–123 divide into those written in the forward (left to right, as shown) and reverse (right to left, as shown) directions to accommodate the serpentine recording scheme preferred with tape formats. There are two hundred fifty-six total data tracks in this example. Other numbers of tracks per servo band are also possible, such as nine, which produces two hundred eighty-eight total data tracks; or ten, which produces three hundred twenty total data tracks.

Each style of servopositioning system prefers an optimum servo read head track width. These widths are not necessarily the same as was preferred in the other embodiment of the invention described above. The amplitude-based servo system prefers a width on the order of the write track pitch to maximize dynamic range. The time-based servo prefers a track width that is much smaller than the track pitch, to minimize azimuth loss and centerline uncertainty.

Figure 8:
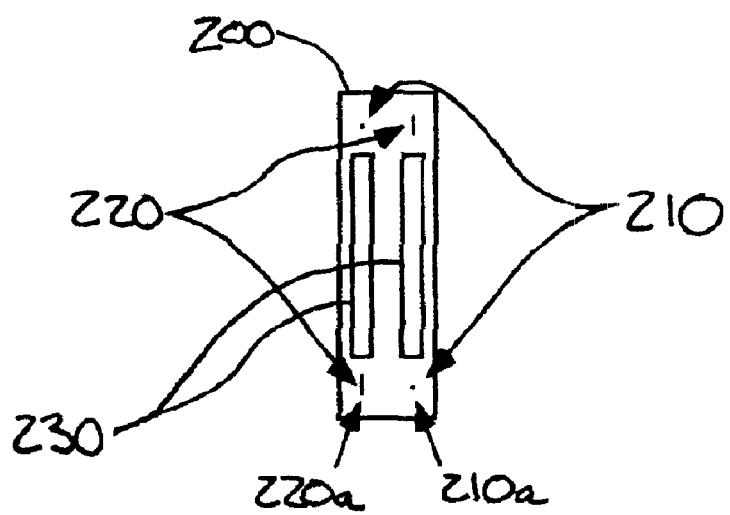
FIG. 8 is a schematic diagram of a recording head for use with an embodiment of the invention.

These differing preferences may be accommodated in a preferred embodiment of the invention by a read-while-write head 200 as shown in FIG. 8. Each of the upper and lower portions of head 200 has a small track width time-based servo reading gap 210a, 210b and a larger amplitude-based servo reading gap 220a, 220b. Amplitude-based servo reading gaps 220a and 220b preferably are sized to accommodate the preference for $T_W$ to be approximately equal to the track pitch. Between the upper and lower portions of head 200 lie conventional arrays of matched thin film magnetoresistive (TFMR) data heads.

It is preferable to use the servo readers on the same gap line as the servo writers, and this is possible with the head arrangement of FIG. 8, assuming the use of conventional 'shared pole' thin film magnetoresistive (TFMR) heads or any other type of head which provides equivalent features. Thus, for example, small track width time-based servo reading gap 210a and amplitude-based servo reading gap 220a define the gap lines for the respective forward and reverse direction servo writing circuits.

To minimize the tolerance error between servo bands, it is desirable to have the same physical head write the time-base servo pulses and the amplitude-base erase windows. This can be accomplished with a special head similar to those already in use on current "Ultrium" type servo writers.

Figure 9:
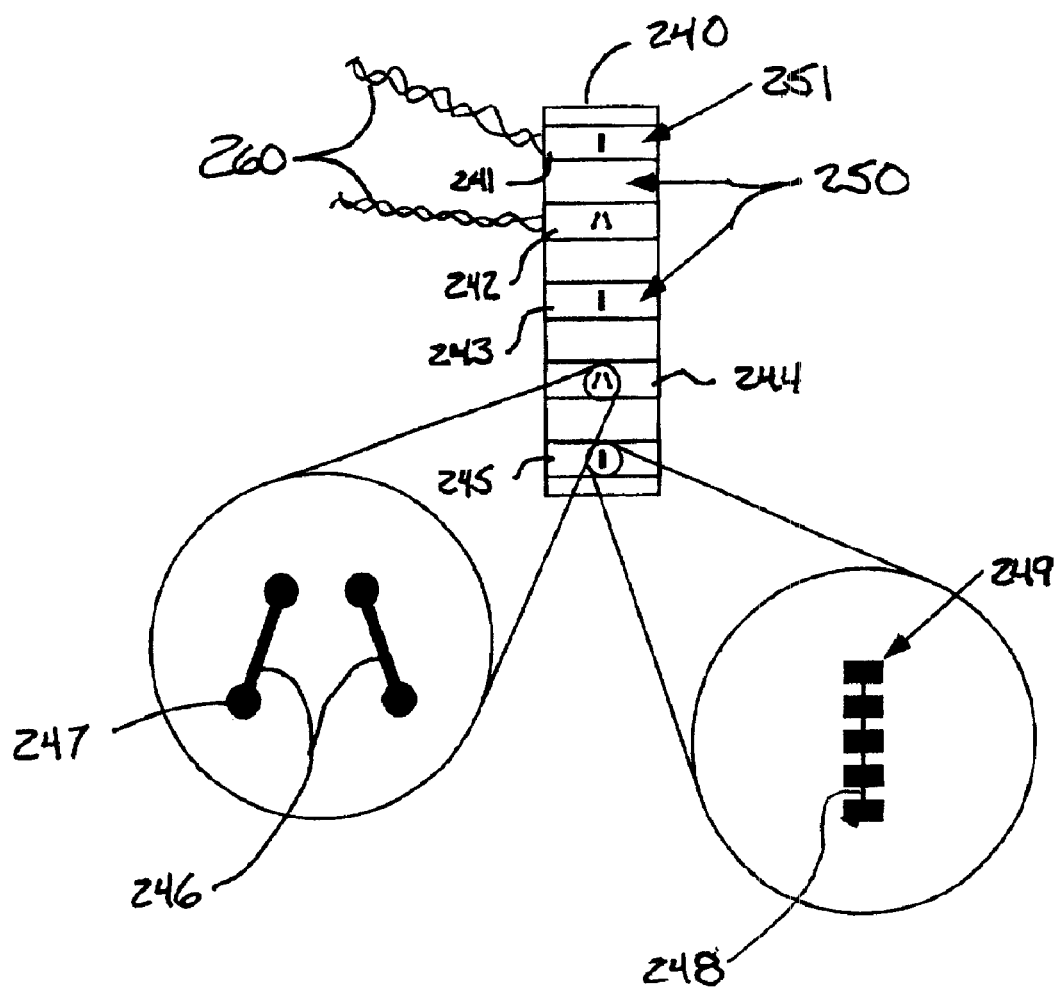
FIG. 9 is a schematic diagram of the face view of a servo write head embodiment of the invention, including magnified views indicated by circles.
Figure 10:
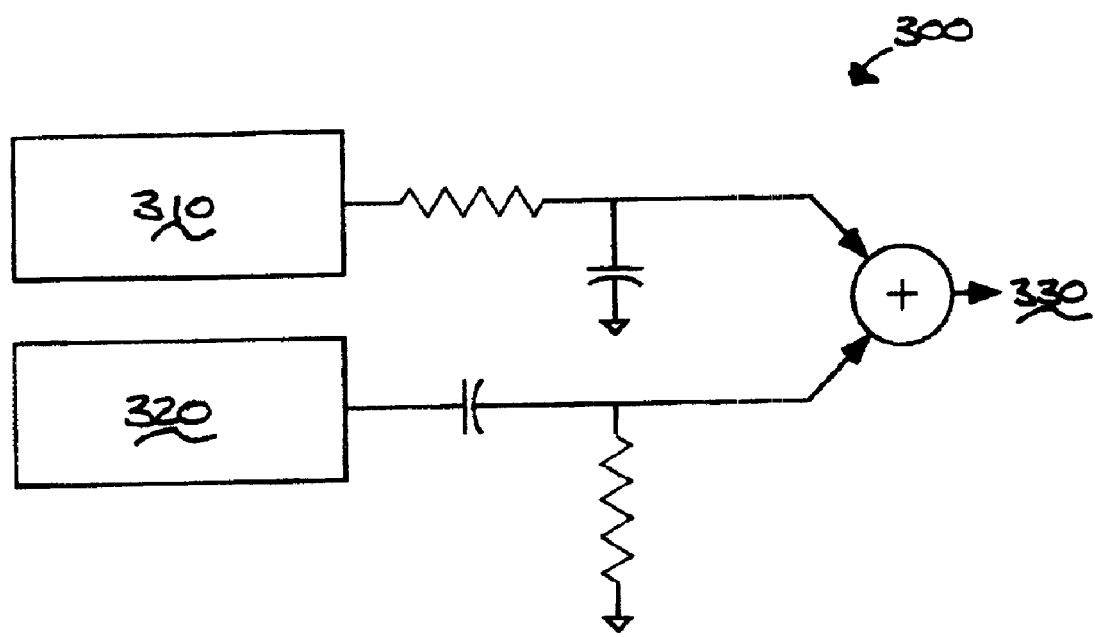
FIG. 10 is a schematic diagram of another embodiment of the invention.

FIG. 9 shows a possible pattern etched out in the magnetic film on the face of a servo write head 240 to accomplish pulse writing and window erasing simultaneously. Five bands 241–245 are shown by way of example. Ferromagnetic film 250 lies over the entire face of head 240, and ferrite split rings 251 lie underneath ferromagnetic film 250 in each of bands 241–245.

In bands 242 and 244, a pair of oppositely opposed gaps 246 is arranged at the slant angle so that the time-base servo pulses can be written in either forward or reverse direction. As illustrated, it is preferred to place "band edge terminator" features 247 at the upper and lower ends of each gap to prevent extraneous signals from being written in the data bands.

In bands 241, 243, and 245, active erase gap 248 creates the amplitude-based erase windows in the sine wave recorded portion of the amplitude-based servo pattern. Rectangular locations 249 represent where the ferromagnetic film 250 has been etched away to concentrate magnetic flux in active erase gap 248.

Head 220 has separate coils for each band 241–245, as indicated by core wires 260 (only two typical of five are shown).

As illustrated in the above discussion and as well understood in the art, terms such as "gap" and "head" may refer to recording mechanisms that stand alone, or are combined with each other into a single physical unit. For example, reference to a system embodiment of the invention comprising a servo read head and a servo write head would include not only a system having two individual heads for those purposes, but also a single "head" combining individual "gaps" or "elements" performing those purposes.

In each of the two major approaches described above, the use of two PES signals depends on whether the drive is in "seeking mode" or in "tracking mode." In seeking mode, the servo controller should primarily depend on the time-based servo, and possibly use the time-based servo to "unwrap" the sawtooth PES signal produced by the amplitude-based servo when crossing track boundaries. In tracking mode, the DC portion of the PES should be obtained from the time-based servo signal, taking advantage of the low centerline error. The high frequency portion of the PES should be obtained from the lower noise and lower phase lag amplitude-based servo.

Preferably, a simple first order crossover network 300, as conceptually illustrated in FIG. 8, can combine the outputs of a time-based PES demodulator 310 and an amplitude-based PES demodulator 320 to produce a combined PES signal 330 in tracking mode, with little phase effect to the servo system. The crossover frequency should be relatively low in frequency to take advantage of the servo system's high LF loop gain.

Additionally, the carrier of the AM servo may be used as a time base reference for measuring the time (distance) of pulse separations in the time-based servo. This could reduce the ISV induced error in the servo PES. The dynamic skew would however reduce the accuracy of this scheme.

Because data storage systems typically contain electric or electronic "circuitry," this term as used above includes analog or digital electronics in any combination. Such circuitry may be "programmed" or "configured" as appropriate by including and arranging discrete components or multifunctional components according to well-known principles. Programming or configuring can be accomplished using programmable logic arrays, microprocessors, digital signal processors, and other equivalent devices, again by following well-known principles. The only limitations on the apparatus or system aspects of the invention are those specifically recited in the claims.

I claim:

1. A servopositioning system for a data recording system, comprising in combination:

a) a linear data recording medium, upon at least a portion of which are written at least one amplitude-based servo pattern, and at least one time-based servo pattern, wherein the amplitude-based servo pattern includes servo windows and edges of the servo windows define servo tracks of the amplitude-based servo pattern, and wherein the time-based servo pattern includes a first pulse and a second pulse wherein at least a portion of the first pulse defines a different slant angle than a corresponding portion of the second pulse, the slant angles of the first and second pulses being defined relative to a vertical transverse direction across a width of the medium; and b) circuitry, separately responsive to the amplitude-based servo and time-based servo patterns, for producing respective position error signals from each servo pattern.

2. The system of claim 1, in which the amplitude-based servo pattern and the time-based servo pattern are written to the medium on at least a portion of a common location of the medium.

3. The system of claim 2, in which the amplitude-based servo pattern and the time-based servo pattern are written to the medium in a common location of the medium.

4. The system of claim 1, in which the circuitry separates the amplitude-based servo and time-based servo patterns from a composite input.

5. The system of claim 4, in which the amplitude-based servo and time-based servo patterns have respective absolute amplitudes that are controlled to provide liberty to the entire system.

6. The system of claim 4, in which the circuitry performs crosstalk cancellation of the amplitude-based servo and time-based servo patterns.

7. The system of claim 1, in which the amplitude-based servo pattern comprises a periodic signal recorded in an area surrounding the servo windows and wherein the servo windows comprise erased windows where the periodic signal is erased.

8. The system of claim 1, in which the amplitude-based servo pattern and the time-based servo pattern are written on different physical locations of the medium.

9. The system of claim 8, in which the amplitude-based servo pattern defines a track width approximately equal to a write track width.

10. The system of claim 8, in which the time-based servo pattern defines a track width much less than a track pitch of the medium.

11. The system of claim 1, further comprising a servo controller having a seeking mode in which the servo controller depends primarily on the time-based servo pattern.

12. The system of claim 11, in which the servo controller depends on position error signals that are produced based on detection of the amplitude-based servo pattern at servo track boundaries.

13. The system of claim 1, further comprising a servo controller having a trucking mode in which a DC portion of position error signals is obtained from the time-based servo pattern.

14. The system of claim 1, further comprising a servo controller having a tracking mode in which a high frequency portion of the position error signals is obtained from the amplitude-based servo pattern.

15. A method comprising:
writing upon at least a portion of a linear data recording medium at least one amplitude-based servo pattern, and at least one time-based servo pattern, wherein the amplitude-based servo pattern includes servo windows and edges of the servo windows define servo tracks of the amplitude-based servo pattern, and wherein the time-based servo pattern includes a first pulse and a second pulse wherein at least a portion of the first pulse defines a different slant angle than a corresponding portion of the second pulse, the slant angles being defined relative to a vertical transverse direction across a width of the medium.

16. The method of claim 15, further comprising writing the amplitude-based servo pattern and the time-based servo pattern to at least a portion of a common location of the medium.

17. The method of claim 16, further comprising writing the amplitude-based servo pattern and the time-based servo pattern to a common location of the medium.

18. The method of claim 15, further comprising:
separating the amplitude-based servo and time-based servo patterns from a composite input; and
producing respective position error signals from each of the servo patterns.

19. The method of claim 18, in which the amplitude-based servo and time-based servo patterns have respective absolute amplitudes that are controlled to provide linearity to the entire system.

20. The method of claim 18, further comprising reducing crosstalk between the amplitude-based servo and time-based servo patterns.

21. The method of claim 15, further comprising writing the time-based servo pattern at the slant angles relative to the transverse direction of the medium, and placing the amplitude-based servo pattern in an azimuth null of the time-based servo pattern.

22. The method of claim 15, further comprising writing the amplitude-based servo pattern and the time-based servo pattern on different physical locations of the medium.

23. The method of claim 15, further comprising writing the amplitude-based servo pattern to have a track width approximately equal to a write track width.

24. The method of claim 15, further comprising writing the time-based servo pattern to have track width much less than track pitch.

25. The method of claim 15, further comprising producing respective position error signals from each of the servo patterns and executing a seeking mode in which a servo controller depends primarily on the time-based servo pattern.

26. The method of claim 15, further comprising producing respective position error signals from each of the servo patterns and using a servo controller that depends on position error signals that are produced based on detection of the amplitude-based servo pattern at servo track boundaries.

27. The method of claim 15, further comprising producing respective position error signals from each of the servo patterns and using a servo controller that has a tracking mode in which a DC portion of the position error signals is obtained from the time-based servo pattern.

28. The method of claim 15, further comprising producing respective position error signals from each of the servo patterns and using a servo controller that has a tracking mode in which a high frequency portion of the position error signals is obtained from the amplitude-based servo pattern.

29. A magnetic data read-while-write head, comprising:
a) two pairs of oppositely arranged time-based servo reading gaps and amplitude-based servo reading gaps that are larger than the time-based servo reading gaps, wherein the amplitude-based reading gaps read from a magnetic medium an amplitude-based servo pattern including servo windows with edges that define servo tracks of the amplitude-based servo pattern, and wherein the time-based servo reading gaps read a time based servo pattern including a first pulse and a second pulse wherein at least a portion of the first pulse defines a different slant angle than a corresponding portion of the second pulse, the slant angles being defined relative to a vertical transverse direction; and
b) between the pairs of oppositely arranged servo reading gaps, matched thin film magnetoresistive data read/write gaps that read data signals recorded between servo bands of the magnetic medium.

30. The head of claim 29, in which the amplitude-based servo reading gaps are sized for a servo track width approximately equal to a servo track pitch.

31. The head of claim 29, in which the servo reading gaps define gap lines for servo writing.

32. A servo writing head, comprising at least one set of time-based servo writing gaps arranged at a slant angle and at least one set of amplitude-based servo writing gaps, configured so that the head can simultaneously write pulses for a time-based servo pattern and erase windows for an amplitude-based servo pattern, wherein the amplitude-based servo pattern includes servo windows and edges of the servo windows define servo tacks of the amplitude-based servo pattern, and wherein the time-based servo pattern includes a first pulse and a second pulse, wherein at least a portion of the first pulse defines a different slant angle than a corresponding portion of the second pulse, the slant angles being defined relative to a vertical transverse direction across a width of a medium recorded by the head.

33. The head of claim 32, in which there is at least one set of oppositely arranged time-based servo writing gaps so that the time-based servo pulses can be written in either forward or reverse direction.

34. A magnetic tape comprising:

an amplitude-based servo pattern including servo windows, wherein edges of the servo windows define servo tracks of the amplitude-based servo pattern; and a time-based servo pattern, wherein the time-based servo pattern include a first pulse and a second pulse wherein at least a portion of the first pulse defines a different slant angle than a corresponding portion of the second pulse, the slant angles being defined relative to a vertical transverse direction across a width of the tape.

35. The magnetic tape of claim 34, wherein the amplitude-based servo pattern and the time-based servo pattern overlap in a common servo band of the tape.

36. The magnetic tape of claim 34, wherein the amplitude-based servo pattern is recorded in an azimuth null of the time-based servo pattern.

* * * * *

UNITED STATES PATENT AND TRADEMARK OFFICE
CERTIFICATE OF CORRECTION

PATENT NO. : 6,873,487 B2
APPLICATION NO. : 09/995175
DATED : March 29, 2005
INVENTOR(S) : Richard W. Molstad It is certified that error appears in the above-identified patent and that said Letters Patent is hereby corrected as shown below:

Column 6,
 Line 63, "liberty" should read --linearity--.

Column 7,
 Line 22, "trucking" should read --tracking--.

Column 9,
 Line 6, "include" should read --includes--.

Signed and Sealed this

Tenth Day of October, 2006

JON W. DUDAS
*Director of the United States Patent and Trademark Office*